US010094203B2

(12) United States Patent
Zaid et al.

(10) Patent No.: US 10,094,203 B2
(45) Date of Patent: Oct. 9, 2018

(54) CORROSION INHIBITORS FOR DRILLING FLUID BRINES

(71) Applicant: Jacam Chemical Company 2013, LLC, Sterling, KS (US)

(72) Inventors: Gene H. Zaid, Sterling, KS (US); David P. Horton, Calgary (CA); Kim Brashear, Sterling, KS (US)

(73) Assignee: CES TECHNOLOGY S.À R.L., Luxembourg (LU)

( * ) Notice: Subject to any disclaimer, the term of this patent is extended or adjusted under 35 U.S.C. 154(b) by 354 days.

(21) Appl. No.: 14/926,658

(22) Filed: Oct. 29, 2015

(65) Prior Publication Data

US 2016/0130494 A1    May 12, 2016

Related U.S. Application Data

(60) Provisional application No. 62/076,277, filed on Nov. 6, 2014.

(51) Int. Cl.
*C09K 8/06* (2006.01)
*C09K 8/54* (2006.01)
*E21B 41/02* (2006.01)
*C23F 11/06* (2006.01)
*C23F 11/12* (2006.01)
*C23F 11/14* (2006.01)
*C23F 11/167* (2006.01)

(52) U.S. Cl.
CPC ............ *E21B 41/02* (2013.01); *C09K 8/54* (2013.01); *C23F 11/06* (2013.01); *C23F 11/124* (2013.01); *C23F 11/141* (2013.01); *C23F 11/1676* (2013.01); *C09K 2208/32* (2013.01)

(58) Field of Classification Search
CPC ....... E21B 41/02; C09K 8/54; C09K 2208/32; C23F 11/10; C23F 11/141; C23F 11/06; C23F 11/124; C23F 11/1676
See application file for complete search history.

(56) References Cited

U.S. PATENT DOCUMENTS

| 4,061,589 A | 12/1977 | Jacob |
| 4,279,768 A | 7/1981 | Busch |
| 4,303,568 A | 12/1981 | May et al. |
| 4,784,778 A | 11/1988 | Shin |
| 4,849,171 A | 7/1989 | Murray |
| 4,869,827 A | 9/1989 | Chagnard, Jr. et al. |
| 5,023,011 A | 6/1991 | Busch et al. |
| 5,171,460 A | 12/1992 | Underdown |
| 5,330,683 A * | 7/1994 | Sufrin ............ C09K 5/20 252/387 |
| 5,589,106 A | 12/1996 | Shim |
| 6,585,933 B1 * | 7/2003 | Ehrhardt ............ C23F 11/08 252/180 |

(Continued)

FOREIGN PATENT DOCUMENTS

| WO | WO-8604634 A1 * | 8/1986 | ............ C09K 8/06 |
| WO | WO-2008084503 A1 * | 7/2008 | ............ C09K 5/54 |

*Primary Examiner* — Daniel P Stephenson

(74) *Attorney, Agent, or Firm* — Hovey Williams LLP

(57) ABSTRACT

Improved corrosion inhibitors for well brines include a phosphonate or salts thereof, and a gluconic acid or salts thereof. The inhibitors are normally injected downhole into the brines. The most preferred phosphonates are amine polyphosphonates, used in combination with alkali metal salts of gluconic acid.

22 Claims, 8 Drawing Sheets

(56) References Cited

U.S. PATENT DOCUMENTS

| | | | | |
|---|---|---|---|---|
| 7,172,677 | B2 | 2/2007 | Thompson et al. | |
| 7,837,931 | B2 * | 11/2010 | Stevens, Jr. | C09K 8/54 422/16 |
| 9,404,188 | B2 * | 8/2016 | Smith | C02F 5/105 |
| 2008/0058226 | A1 * | 3/2008 | Greaves | C09K 8/524 507/90 |
| 2011/0082057 | A1 * | 4/2011 | Zhang | C09K 8/512 507/90 |
| 2015/0011453 | A1 * | 1/2015 | Bennett | C11D 3/2006 510/402 |
| 2015/0037202 | A1 * | 2/2015 | Harrington | C02F 5/10 422/7 |
| 2015/0107832 | A1 * | 4/2015 | DeWolf | C09K 8/52 166/266 |
| 2015/0141302 | A1 * | 5/2015 | Nasr-El-Din | C09K 8/52 507/241 |
| 2015/0184069 | A1 * | 7/2015 | Nuutinen | C09K 11/06 210/700 |
| 2016/0130494 | A1 * | 5/2016 | Zaid | C23F 11/06 166/244.1 |
| 2017/0306504 | A1 * | 10/2017 | Moloney | C23F 11/10 |

* cited by examiner

CORROSION INHIBITORS FOR DRILLING FLUID BRINES

CROSS-REFERENCE TO RELATED APPLICATION

This application claims the benefit of U.S. Provisional Patent Application Ser. No. 62/076,277, filed Nov. 6, 2014, which is incorporated herein by reference.

BACKGROUND OF THE INVENTION

Field of the Invention

The present invention is broadly concerned with improved anti-corrosion products for use with heavy brines employed in the petroleum industry during well drilling. More particularly, the invention is concerned with such products and corresponding methods wherein corrosion inhibitors comprising amounts of a phosphonate or salts thereof, and gluconic acid or salts thereof, are introduced into the brines. The combined ingredients of the inhibitors are synergistically effective in reducing corrosion rates attributable to the brines.

Description of the Prior Art

Calcium chloride and calcium nitrate brines are used in establishing and maintaining petroleum (i.e., oil and gas) wells. For example, calcium chloride brines are used in drilling muds to cool and lubricate well bits and to remove cuttings from the hole. The brines help maintain the consistency of the drilling muds and add density thereto, to better enable the muds to overcome formation pressures and thereby oil, gas, and water in place. Such brines also inhibit clay and shale hydration and add needed weight to the muds.

Brines are also used as completion fluids just before the producing formation is reached, to flush the hole clean of solids so that the casing can be cemented in place. As clear, substantially solid-free brines, calcium chloride and calcium nitrate brines are ideal as completion fluids.

Once a well casing is cemented in place, smaller diameter tubing is inserted in the casing, which makes the flow of oil or gas more efficient and can be replaced if plugs develop. Tubing in used with packer fluid that keeps the well fluids away from the casing to minimize corrosion. Calcium chloride and calcium nitrate brines are used in the packing injected into the annular space between the tubing and the casing in order to maintain pressure levels.

Finally, these brines can also be used as workover fluids, by flushing wells free of solids before they are repaired, or before reworking a well that has been idle.

Notwithstanding the multiple uses of these brines, problems remain. A principal drawback is the fact that the brines tend to be highly corrosive to downhole equipment surfaces, causing pitting and erosion thereof often with the result that the equipment in question must be repaired or replaced at frequent intervals.

Attempts have been made to control the corrosive activity of well brines, see e.g., U.S. Pat. No. 4,784,778. This patent teaches that particular thio compounds and aldose group antioxidants may be used in the context of zinc halide-based, high density fluids. U.S. Pat. No. 5,171,460 describes scale inhibitors for use with calcium and similar brines, comprising a phosphonomethylated oxyalkyleneamine. Other background references include U.S. Pat. Nos. 4,061,589, 4,279,768, 4,303,568, 4,849,171, 4,869,827, 5,330,683, 5,589,106, 5,023,011, and 7,172,677, and PCT Publications Nos. WO 86/04634 and WO 2008/084503. However, no fully satisfactory anti-corrosion system for calcium chloride and calcium nitrate brines has heretofore been developed.

SUMMARY OF THE INVENTION

The present invention overcomes the problems outlined above, and provides improved, synergistic anti-corrosion systems for use with calcium chloride or calcium nitrate brines employed in the oil and gas industry. Broadly speaking, the invention provides methods of inhibiting corrosion of metal surfaces in petroleum well equipment when using such brines, wherein a selected brine is injected into the well and a corrosion inhibitor is mixed therewith; the inhibitor includes respective amounts of a phosphonate or salts thereof, and gluconic acid or salts thereof. Particularly preferred phosphates are the amine polyphosphonates.

The invention also provides corrosion inhibitors for brines selected from the group consisting of calcium chloride or calcium nitrate brines, consisting essentially of a phosphonate or salts thereof, and gluconic acid or salts thereof.

DETAILED DESCRIPTION OF THE PREFERRED EMBODIMENT

Figure 1:
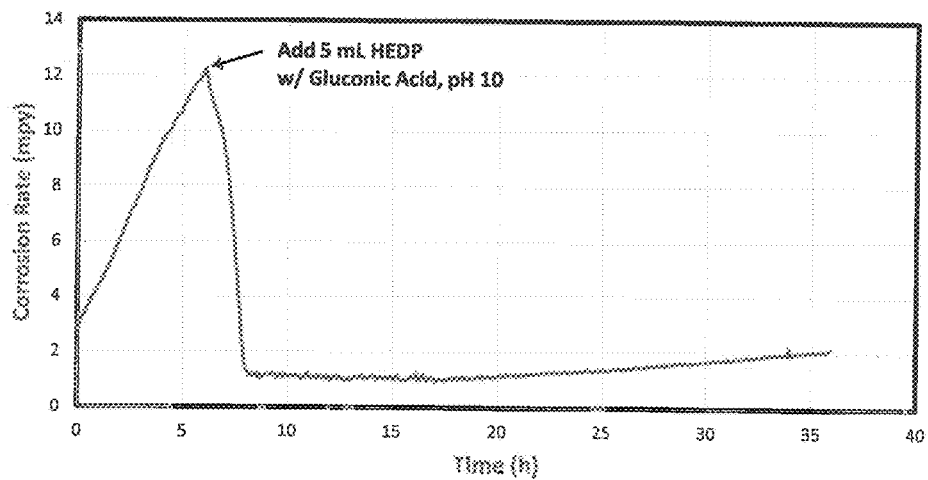
FIG. 1 is a graph of the anti-corrosion results of the Example 1 test.

The present invention provides synergistic anti-corrosion inhibitors for use with drilling fluid brines, wherein the inhibitors generally include a phosphonate and gluconic acid and/or a precursor of gluconic acid, or corresponding gluconate salts.

Brines useful in the invention are dispersions or solutions containing calcium chloride and/or calcium nitrate. Generally, the brines should contain from about 25-40% by weight calcium chloride, and more preferably from about 28-34% by weight. These brines should also have a density of from about 1000 kg/m³ to saturation, and more preferably from about 1200 kg/m³ to saturation. Saturation points are dependent upon the ionic species present in the brines, and potentially well temperatures. The specific gravities of the brines are normally in the range of from about 1.2-1.45 at 15.6° C. The pH meter-measured levels of pH of the brines should be from about 8-13, more preferably from about 9.5-11. The ionic strength of the brines suppresses hydronium ion activity, which is what the pH meter electrode measures. As such, the measured pH values may not be the "true" pH, but rather is an artifact of the pH meter apparatus. In this connection, pH measured manually by pH strips usually does not correlate with the value measured using a pH meter in these brines.

Suitable brines typically have impurities such as magnesium, sodium, and potassium ion, as well as the corresponding chloride salts thereof. Calcium ion is typically present at a level of from about 8-14% by weight, whereas magnesium chloride is present at a level of from about 2-6% by weight. The other impurities are at minor levels in the brines. Particularly preferred brines are the commercially available mined calcium chloride brines produced in Alberta, Canada, and especially a brine commercialized under the designation Gold Plus 35%, Clear Brine.

A variety of different effective phosphonates may be used in the invention, so long as they appropriate dispersibility in the brines and are effective corrosion inhibitors. Advantageously, the phosphonates are dispersible at levels up to about 200,000 ppm in the brines, and have 2-8 phosphono groups therein, more preferably 2-5 phosphono groups. Primary, secondary, and/or tertiary amine phosphonates are generally preferred, although use of these phosphonates is not mandatory.

A particularly preferred class of tertiary amine phosphonates have the general formula

X—N—Y₂    I, where X is selected from the group consisting of alkyl phosphonates of the formula

II alkyl alcohols of the formula

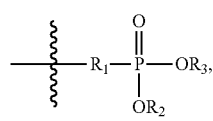

III alkoxyalcohols of the formula

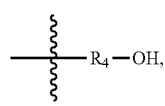

IV and mixtures thereof; and Y is selected from the group consisting of alkylphosphonates of the formula

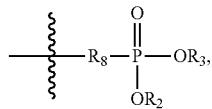

V and alkylaminediphosphonates of the formula

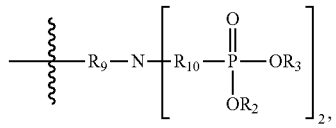

VI and mixtures thereof where each respective $R_1$, and $R_4$ through $R_{10}$ moiety is independently selected from the group consisting of C1-C6 straight or branched chain alkyl groups, and each respective $R_2$ and $R_3$ moiety is independently selected from the group consisting of H and C1-C6 straight or branched chain alkyl groups. In each instance, the moieties may be the same as or different from other such moieties. Salts of any of the foregoing phosphonates, and especially the alkali metal salts, are also usable in the invention.

Specific examples of these preferred tertiary amine phosphonates include ammonium phosphonate.

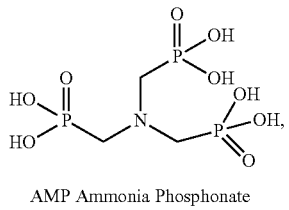

VII

AMP Ammonia Phosphonate

DETA Phosphonate

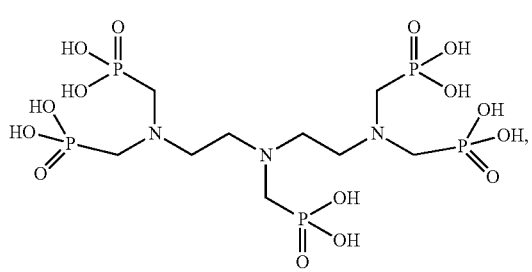

VIII

DETA Phosphonate monoethanolamine phosphonate

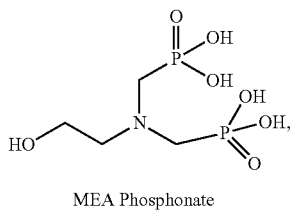

MEA Phosphonate and 2-(aminoethoxy)ethanol phosphonate:

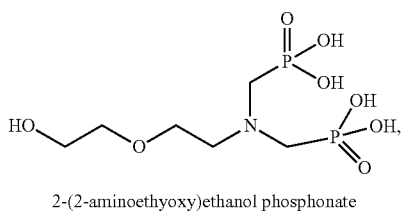

2-(2-aminoethyoxy)ethanol phosphonate

As indicated previously, the phosphonates need not be amine phosphonates. For example, 1-hydroxyethylidene-1,1-diphosphoric acid Formula XI and salts thereof can also be employed.

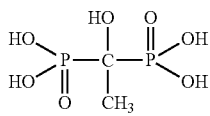

HEDP
1-Hydroxyethylidene-
1,1-Diphosphonic acid

Other exemplary non-amine phosphonates include phosphonobutane-1,2,4-tricarboxylic acid, and 2-hydroxyphosphonocarboxylic acid, and salts thereof.

Gluconic acid and the salts thereof, particularly the alkali metal salts, are used to good effect in the invention. Precursors of gluconic acid may also be used, e.g., gluconolactone, which yield gluconic acid in aqueous systems. Thus, as used herein, "gluconic acid and the salts thereof" shall mean gluconic acid, salts thereof, and precursors of any of the foregoing.

The corrosion inhibitors of the invention preferably include from about 30-70% by weight phosphonate (more preferably from about 40-60% by weight, and most preferably about 50% by weight), and correspondingly from about 70-30% by weight gluconic acid or gluconate (more preferably from about 60-40% by weight, and most preferably about 50% by weight). The inhibitors are preferably in the form of aqueous dispersions or solutions having pH levels of from about 8-13, more preferably from about 9-12, and most preferably from about 10-10.5.

Advantageously, the components of the corrosion inhibitors are present in synergistically effective amounts, meaning that the amounts of the phosphonates and the gluconic acids or gluconates are in coordinated amounts of each, which in combination give increased anti-corrosion activities in excess of the anti-corrosion activities which could be obtained by individual use of the respective components; stated otherwise, the coordinated amounts of the components give anti-corrosion effects greater than a mere additive effect obtainable through the use of the components alone in the same amounts.

In use, the corrosion inhibitors are either directly added to the brines before injection thereof, or may be added with other fluids, which ultimately mix with the brines during use thereof. The inhibitors should be used at a level to provide from about 10-10,000 ppm inhibitor in the brine, more preferably from about 1,000-8,000 ppm, and most preferably from about 2,000-5,000 ppm. Alternately, the phosphonate or salts thereof, and the gluconic acid or salts thereof, may be individually introduced into the well for mixing into the brine, to provide the complete corrosion inhibitor in the above-listed amounts.

EXAMPLES

The following Examples set forth preferred brine corrosion inhibitor products and methods of testing thereof. It is to be understood that these examples are provided by way of illustration only, and nothing therein should be taken as a limitation upon the overall scope of the invention.

In each of the experiments described below, a Pine Research Instruments rotating cylinder electrode (RCE) apparatus equipped with a Gamry potentiostat and DC105 software was employed. The electrode material was carbon steel and had a surface area of 3 $cm^2$, and was rotated at 700 rpm. Experiments were conducted at ambient pressure and a brine temperature of 50° C. at a solution pH of between 10 and 12. Each test solution contained approximately 15% by weight calcium chloride in deionized water with 5 mL ethanolamine per liter.

Corrosion rates were monitored by Linear Polarization Resistance (LPR) measurements every 5 minutes for a period of approximately 30 hours. The test inhibitors were added at approximately 6 hours at specific concentrations and pH levels.

Example 1

In this Example, the calcium chloride solution had a pH of 10.4, and 5 mL (5,000 ppm) of a test inhibitor containing 50 g HEDP (1-hydroxyethane 1,1 diphosphonic acid, WCS 3730, commercialized by Jacam Chemical Company 2013, LLC) and 50 g gluconic acid in 50 g deionized water. Sufficient 50% sodium hydroxide was added to elevate the pH of the inhibitor to 10. As illustrated in FIG. 1, the corrosion rate decreased precipitously after addition of the inhibitor and was maintained at a low level throughout the remainder of the test.

Example 2

Figure 2:
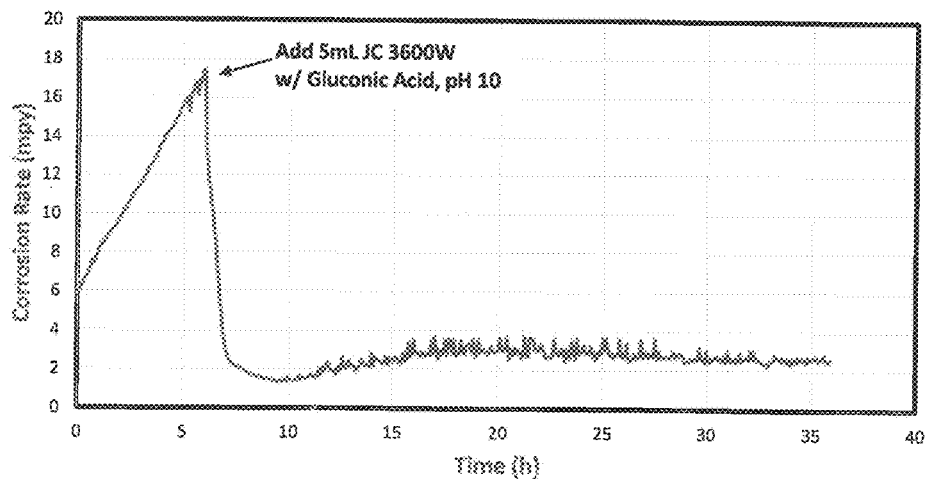
FIG. 2 is a graph of the anti-corrosion results of the Example 2 test.

In this Example, the calcium chloride solution had a pH of 10.4, and 5 mL (5,000 ppm) of a test inhibitor containing 50 g DETA phosphonate (JC 3600 W, commercialized by Jacam Chemical Company 2013, LLC) and 50 g gluconic acid in 50 g deionized water. Sufficient 50% sodium hydroxide was added to elevate the pH of the inhibitor to 10. As illustrated in FIG. 2, the corrosion rate decreased precipitously after addition of the inhibitor and was maintained at a low level throughout the remainder of the test.

Example 3

Figure 3:
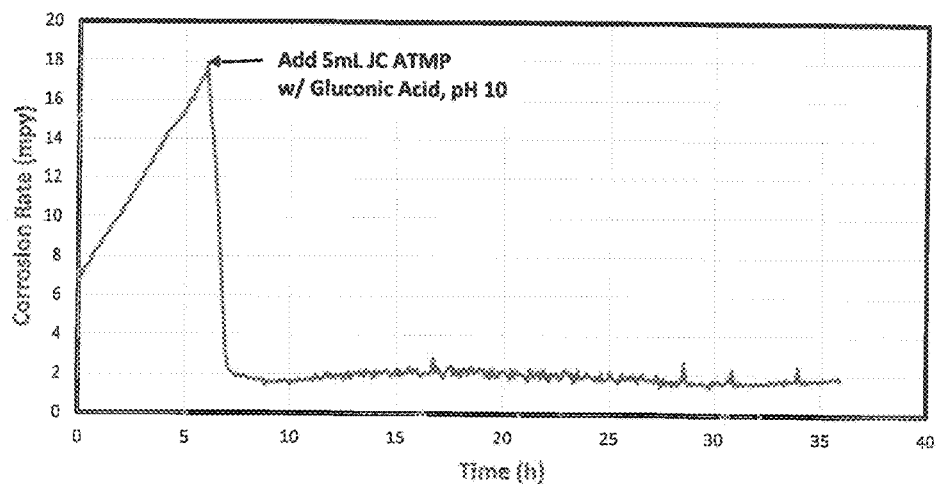
FIG. 3 is a graph of the anti-corrosion results of the Example 3 test.

In this Example, the calcium chloride solution had a pH of 10.4, and 5 mL (5,000 ppm) of a test inhibitor containing 50 g ATMP (aminotrismethylene phosphonic acid, commercialized by Jacam Chemical Company 2013, LLC) and 50 g gluconic acid in 50 g deionized water. Sufficient 50% sodium hydroxide was added to elevate the pH of the inhibitor to 10. As illustrated in FIG. 3, the corrosion rate decreased precipitously after addition of the inhibitor and was maintained at a low level throughout the remainder of the test.

Example 4

Figure 4:
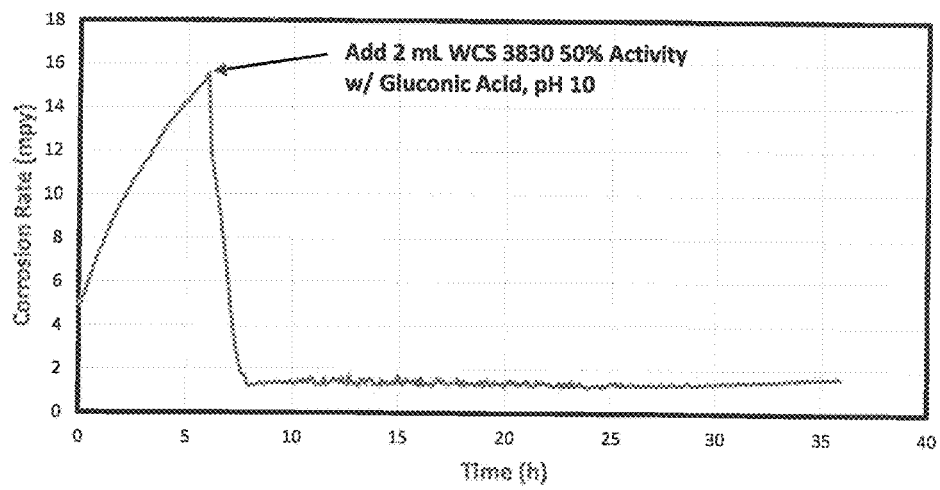
FIG. 4 is a graph of the anti-corrosion results of the Example 4 test.

In this Example, the calcium chloride solution had a pH of 10.4, and 2 mL (2,000 ppm) of a test inhibitor containing 50 g methanolamine phosphonate (50% active), WCS 3830, commercialized by Jacam Chemical Company 2013, LLC, and 50 g gluconic acid in 50 g deionized water. Sufficient 50% sodium hydroxide was added to elevate the pH of the inhibitor to 10. As illustrated in FIG. 4, the corrosion rate decreased precipitously after addition of the inhibitor and was maintained at a low level throughout the remainder of the test.

Example 5

Figure 5:
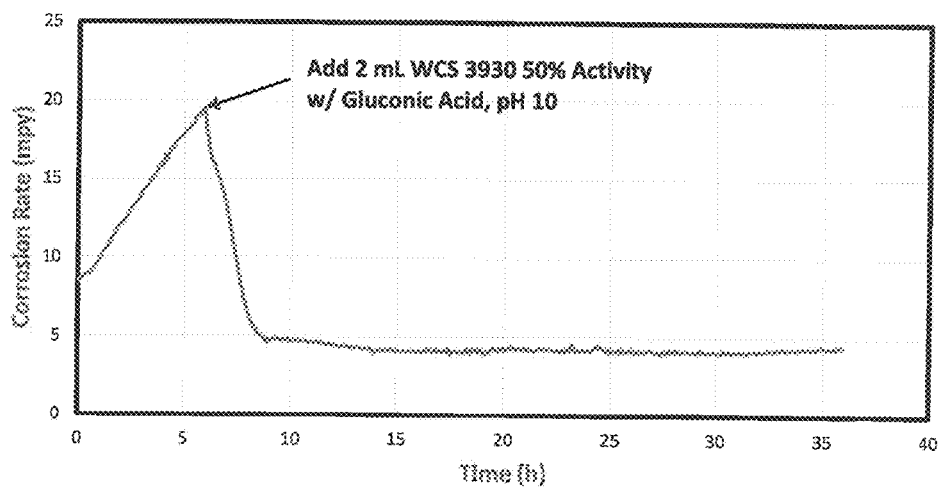
FIG. 5 is a graph of the anti-corrosion results of the Example 5 test.

In this Example, the calcium chloride solution had a pH of 10.4, and 2 mL (2,000 ppm) of a test inhibitor containing 50 g 2-(aminoethoxy)ethanol phosphonate (50% active), WCS 3930, commercialized by Jacam Chemical Company 2013, LLC, and 50 g gluconic acid in 50 g deionized water. Sufficient 50% sodium hydroxide was added to elevate the pH of the inhibitor to 10. As illustrated in FIG. 5, the corrosion rate decreased precipitously after addition of the inhibitor and was maintained at a low level throughout the remainder of the test.

Example 6

Figure 6:
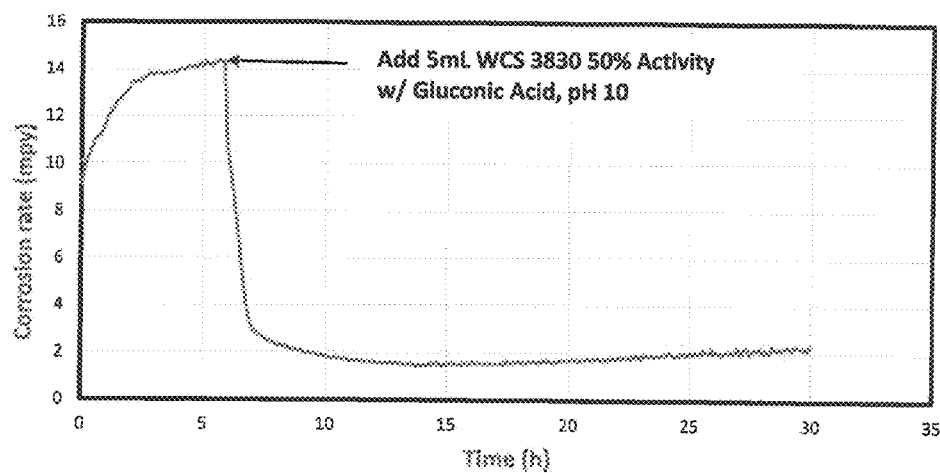
FIG. 6 is a graph of the anti-corrosion results of the Example 6 test.

In this Example, the calcium chloride solution had a pH of 11, and 5 mL (5,000 ppm) of a test inhibitor containing 50 g WCS 3830 (50% active) and 50 g gluconic acid in 50 g deionized water. Sufficient 50% sodium hydroxide was added to elevate the pH of the inhibitor to 10. As illustrated in FIG. 6, the corrosion rate decreased precipitously after addition of the inhibitor and was maintained at a low level throughout the remainder of the test.

Example 7

Figure 7:
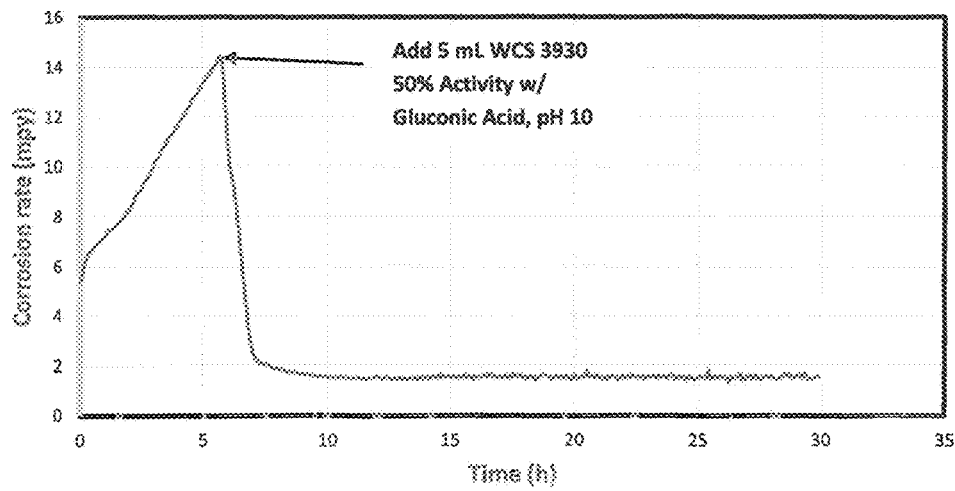
FIG. 7 is a graph of the anti-corrosion results of the Example 7 test.

In this Example, the calcium chloride solution had a pH of 11, and 5 mL (5,000 ppm) of a test inhibitor containing 50 g WCS 3930 (50% active) and 50 g gluconic acid in 50 g deionized water. Sufficient 50% sodium hydroxide was added to elevate the pH of the inhibitor to 10. As illustrated in FIG. 7, the corrosion rate decreased precipitously after addition of the inhibitor and was maintained at a low level throughout the remainder of the test.

Example 8

Figure 8:
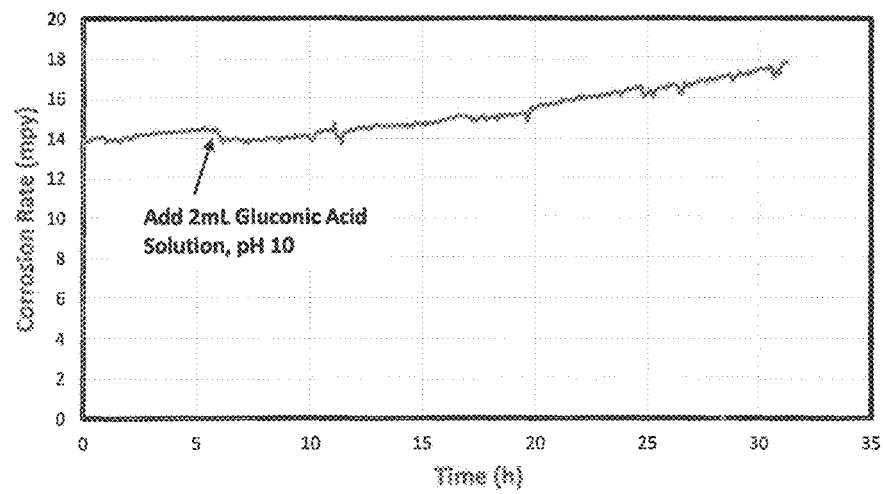
FIG. 8 is a graph of the anti-corrosion results of the Example 8 test.

In this Example, the calcium chloride solution had a pH of 10.5, and 2 mL (2,000 ppm) of a test inhibitor containing 50 g gluconic acid in 50 g deionized water. Sufficient 50% sodium hydroxide was added to elevate the pH of the inhibitor to 10.01. As illustrated in FIG. 8, the addition of gluconic acid alone had no perceptible effect on the corrosion rate.

Example 9

Figure 9:
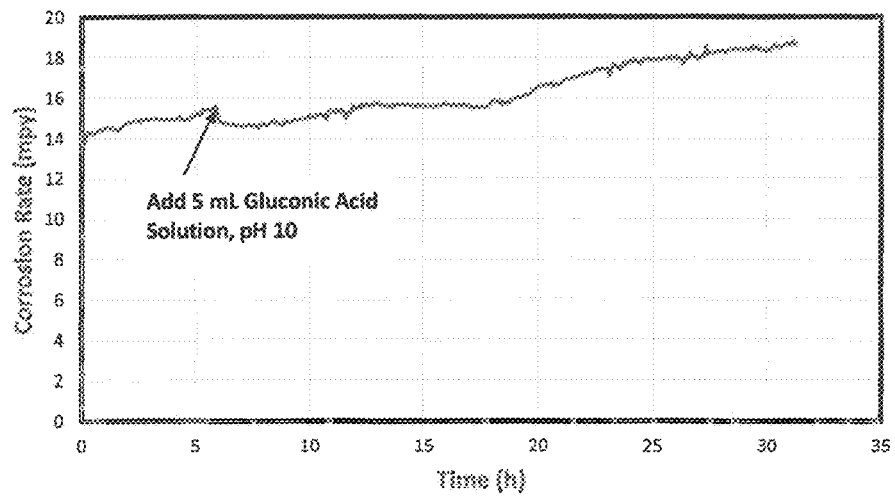
FIG. 9 is a graph of the anti-corrosion results of the Example 9 test.

In this Example, the calcium chloride solution had a pH of 10.5, and 5 mL (5,000 ppm) of a test inhibitor containing 50 g gluconic acid in 50 g deionized water. Sufficient 50% sodium hydroxide was added to elevate the pH of the inhibitor to 10.01. As illustrated in FIG. 9, the addition of gluconic acid alone had no perceptible effect on the corrosion rate.

Example 10

Figure 10:
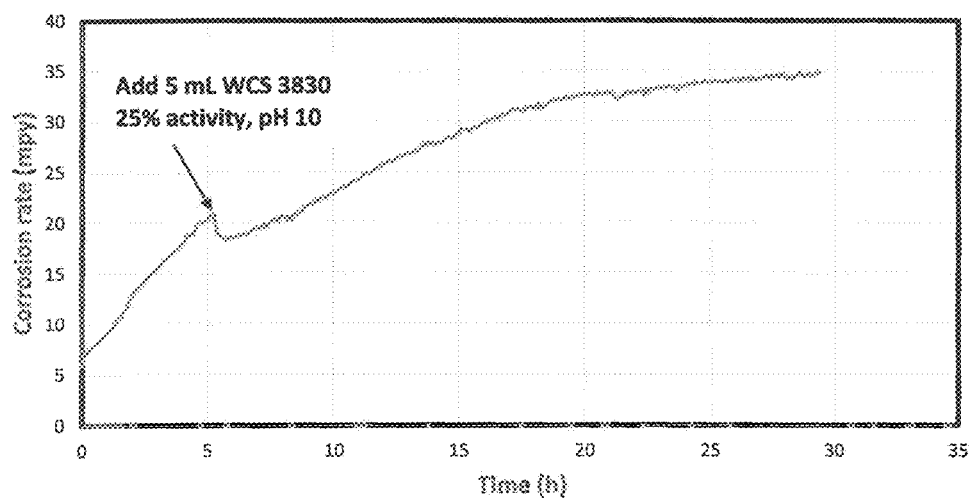
FIG. 10 is a graph of the anti-corrosion results of the Example 10 test.

In this Example, the calcium chloride solution had a pH of 12, and 5 mL (5,000 ppm) of a test inhibitor containing 50 g WCS 3830 (25% active) in 50 g deionized water. Sufficient 50% sodium hydroxide was added to elevate the pH of the inhibitor to 10.01. As illustrated in FIG. 10, the addition of gluconic acid alone had no perceptible effect on the corrosion rate.

Example 11

Figure 11:
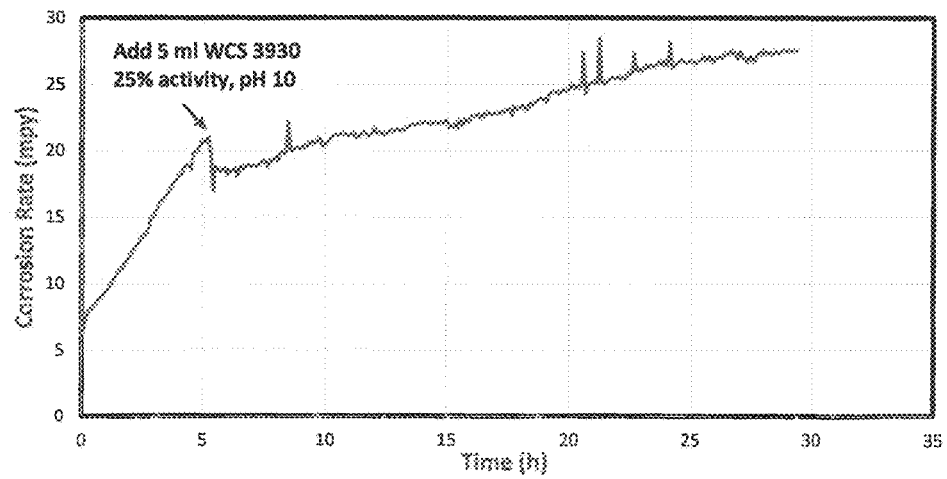
FIG. 11 is a graph of the anti-corrosion results of the Example 11 test.

In this Example, the calcium chloride solution had a pH of 12, and 5 mL (5,000 ppm) of a test inhibitor containing 50 g WCS 3930 (25% active) in 50 g deionized water. Sufficient 50% sodium hydroxide was added to elevate the pH of the inhibitor to 10.05. As illustrated in FIG. 11, the addition of gluconic acid alone had no perceptible effect on the corrosion rate.

Example 12

Figure 12:
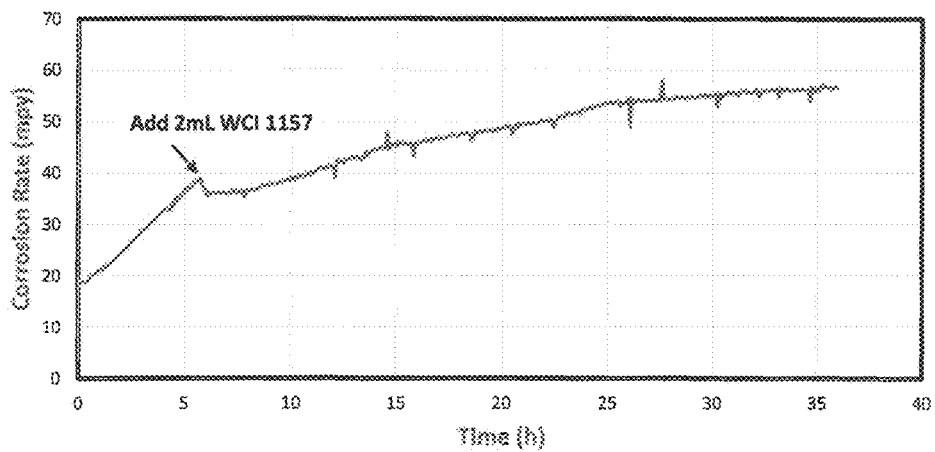
FIG. 12 is a graph of the anti-corrosion results of the Example 12 test.

In this Example, the calcium chloride solution had a pH of 10.3, and 2 mL of a commercially available neutralized amine corrosion inhibitor (WCI 1157, a mixture of neutralized imidazoline tallow diamine and quaternary amines, pH 4.87, commercialized by Jacam Chemical Company 2013, LLC) was added to the brine. As illustrated in FIG. 12, no perceptible decrease in corrosion was observed.

Example 13

Figure 13:
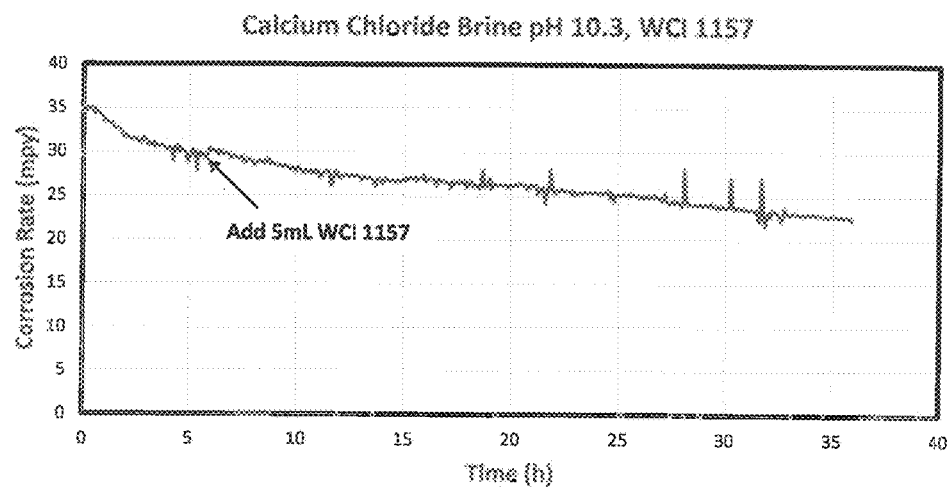
FIG. 13 is a graph of the anti-corrosion results of the Example 13 test.

This Example is identical with Example 12, except that 5 mL of the WCI 1157 product was added to the brine. This resulted in a slight decrease in corrosion, as illustrated in FIG. 13.

Example 14

Figure 14:
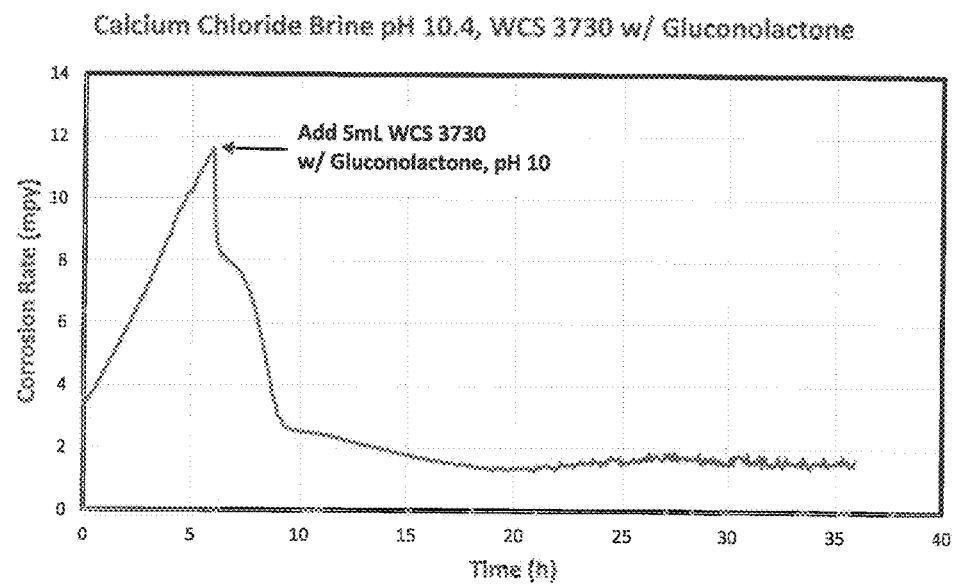
FIG. 14 is a graph of the anti-corrosion results of the Example 14 test.
Figure 15:
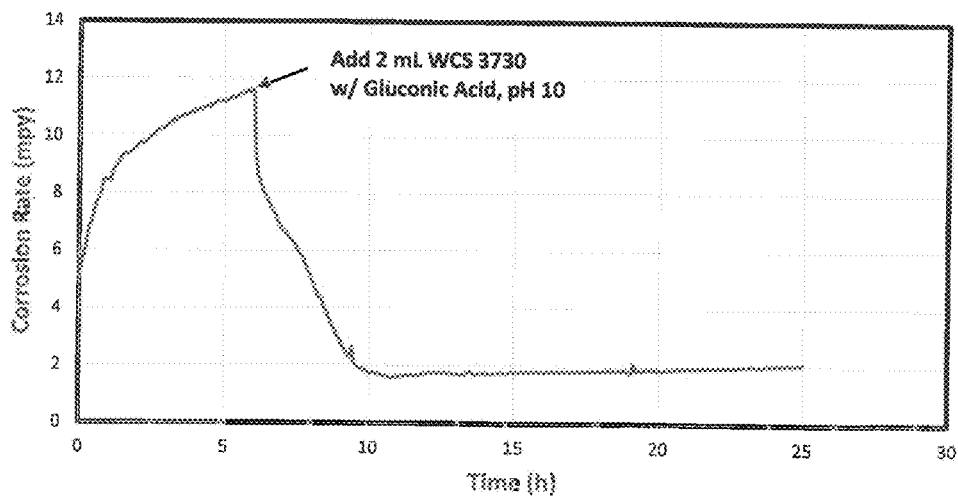
FIG. 15 is a graph of the anti-corrosion results of the Example 15 test.

In this Example, the calcium chloride solution had a pH of 10, and 5 mL (5,000 ppm) of a test inhibitor containing 50 g WCS 3730 and 50 g gluconolactone in 50 g deionized water. Sufficient 50% sodium hydroxide was added to elevate the pH of the inhibitor to 10. As illustrated in FIG. 14, the corrosion rate decreased precipitously after addition of the inhibitor and was maintained at a low level throughout the remainder of the test.

Example 15

In this Example, the calcium chloride solution had a pH of 10, and 2 mL (2,000 ppm) of a test inhibitor containing 50 g WCS 3730 and 50 g gluconic acid in 50 g deionized water. Sufficient 50% sodium hydroxide was added to elevate the pH of the inhibitor to 10. As illustrated in FIG.

15, the corrosion rate decreased precipitously after addition of the inhibitor and was maintained at a low level throughout the remainder of the test.

Example 16

Figure 16:
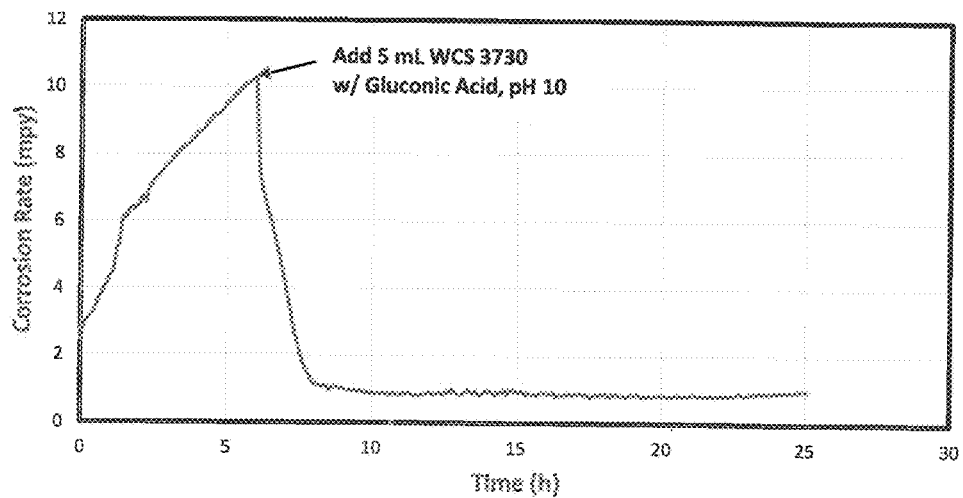
FIG. 16 is a graph of the anti-corrosion results of the Example 16 test.

This Example is identical to Example 15, except that 5 mL (5,000 ppm) of the test inhibitor was used. As illustrated in FIG. 16, the corrosion rate decreased precipitously after addition of the inhibitor and was maintained at a low level throughout the remainder of the test.

As is evident from the foregoing results, the corrosion test utilizing the individual ingredients of the products of the invention, namely the selected phosphonate or gluconic acid (Examples 8-11) demonstrated no anti-corrosion effects, whereas the products of the invention gave very significant results. Thus, the synergistic behavior of the products of the invention is concerned. As further illustrated in Examples 12 and 13, use of a conventional amine corrosion inhibitor had no significant beneficial effect.

We claim:

1. A method of inhibiting corrosion of metal surfaces in petroleum well equipment when using brines during petroleum recovery, comprising the steps of:
   injecting a brine selected from the group consisting of calcium chloride and calcium nitrate, and mixtures thereof, into said well for contact with said metal surfaces;
   mixing a corrosion inhibitor with said brine, said inhibitor comprising respective amounts of a phosphonate or salts thereof, and gluconic acid or salts thereof, said phosphonate being a tertiary amine phosphonate having the general formula

$$X-N-Y_2 \quad \quad I,$$

where X is selected from the group consisting of alkyl phosphonates of the formula

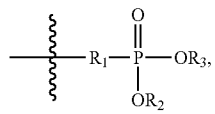

II alkyl alcohols of the formula

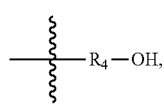

III alkoxyalcohols of the formula

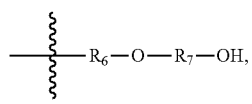

IV and mixtures thereof; and Y is selected from the group consisting of alkylphosphonates of the formula

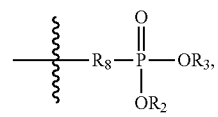

V and alkylaminediphosphonates of the formula

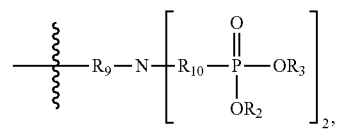

VI and mixtures thereof, where each respective $R_1$ and $R_4$ through $R_{10}$ moiety is independently selected from the group consisting of C1-C6 straight or branched chain alkyl groups, and each respective $R_2$ and $R_3$ moiety is independently selected from the group consisting of H and C1-C6 straight or branched chain alkyl groups.

2. The method of claim 1, said inhibitor comprising from about 30-70% by weight of said phosphonate or salts thereof, and from about 70-30% by weight of said gluconic acid or salts thereof.

3. The method of claim 1, said inhibitor being present at a level of from about 10-10,000 ppm in said brine.

4. The method of claim 1, said inhibitor being mixed with said brine prior to said injection of said brine into said well.

5. The method of claim 1, including the step of individually introducing said phosphonate or salts thereof, and said gluconic acid or salts thereof, into said well.

6. The method of claim 1, said inhibitor being in the form of an aqueous dispersion and having a pH of from about 8-13.

7. A corrosion inhibitor for brines selected from the group consisting of calcium chloride or calcium nitrate brines, or mixtures thereof, said inhibitor consisting essentially of a phosphonate or salts thereof, and gluconic acid or salts thereof, said phosphonate being a tertiary amine phosphonate having the general formula

$$X-N-Y_2 \quad \quad I,$$

where X is selected from the group consisting of alkyl phosphonates of the formula

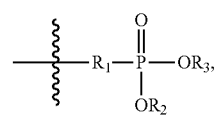

II alkyl alcohols of the formula

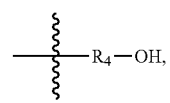

III alkoxyalcohols of the formula

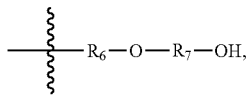

IV and mixtures thereof; and Y is selected from the group consisting of alkylphosphonates of the formula

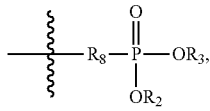

V and alkylaminediphosphonates of the formula

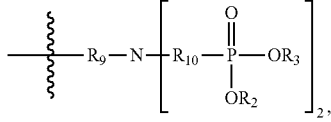

VI and mixtures thereof, where each respective $R_1$ and $R_4$ through $R_{10}$ moiety is independently selected from the group consisting of C1-C6 straight or branched chain alkyl groups, and each respective $R_2$ and $R_3$ moiety is independently selected from the group consisting of H and C1-C6 straight or branched chain alkyl groups.

8. The inhibitor of claim 7, said inhibitor comprising from about 30-70% by weight of said phosphonate or salts thereof, and from about 70-30% by weight of said gluconic acid or salts thereof.

9. The inhibitor of claim 7, said inhibitor being in the form of an aqueous dispersion and having a pH of from about 8-13.

10. A well brine selected from the group consisting of calcium chloride or calcium nitrate brines, or mixtures thereof, in combination with a corrosion inhibitor comprising a phosphonate or salts thereof, and gluconic acid or salts thereof, said phosphonate being a tertiary amine phosphonate having the general formula $$X-N-Y_2 \qquad I,$$

where X is selected from the group consisting of alkyl phosphonates of the formula

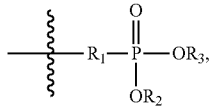

II alkyl alcohols of the formula

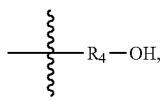

III alkoxyalcohols of the formula

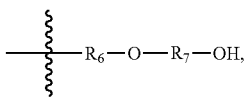

IV and mixtures thereof; and Y is selected from the group consisting of alkylphosphonates of the formula

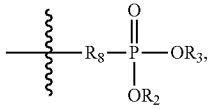

V and alkylaminediphosphonates of the formula

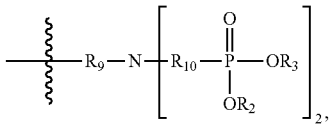

VI and mixtures thereof, where each respective $R_1$ and $R_4$ through $R_{10}$ moiety is independently selected from the group consisting of C1-C6 straight or branched chain alkyl groups, and each respective $R_2$ and $R_3$ moiety is independently selected from the group consisting of H and C1-C6 straight or branched chain alkyl groups.

11. The well brine of claim 10 said inhibitor comprising from about 30-70% by weight of said phosphonate or salts thereof, and from about 70-30% by weight of said gluconic acid or salts thereof.

12. The well brine of claim 10 said inhibitor being present at a level of from about 10-10,000 ppm in said brine.

13. The well brine of claim 10, said inhibitor being in the form of an aqueous dispersion and having a pH of from about 8-13.

14. A method of inhibiting corrosion of metal surfaces in petroleum well equipment when using brines during petroleum recovery, comprising the steps of:
   injecting a brine selected from the group consisting of calcium chloride and calcium nitrate, and mixtures thereof, into said well for contact with said metal surfaces;
   mixing a corrosion inhibitor with said brine, said inhibitor comprising respective amounts of a phosphonate or salts thereof, and gluconic acid or salts thereof,
   said inhibitor being present at a level of from about 10-10,000 ppm in said brine.

15. The method of claim 14, said phosphonate being a tertiary amine phosphonate.

16. A well brine selected from the group consisting of calcium chloride or calcium nitrate brines, or mixtures thereof, in combination with a corrosion inhibitor comprising a phosphonate or salts thereof, and gluconic acid or salts thereof, said inhibitor being present at a level of from about 10-10,000 ppm in said brine.

17. A method of inhibiting corrosion of metal surfaces in petroleum well equipment when using brines during petroleum recovery, comprising the steps of:

injecting a brine selected from the group consisting of calcium chloride and calcium nitrate, and mixtures thereof, into said well for contact with said metal surfaces;

mixing a corrosion inhibitor with said brine, said inhibitor comprising respective amounts of a phosphonate or salts thereof, and gluconic acid or salts thereof, said phosphonate being an amine phosphonate.

18. The method of claim 17, said phosphonate being an amine polyphosponate.

19. A corrosion inhibitor for brines selected from the group consisting of calcium chloride or calcium nitrate brines, or mixtures thereof, said inhibitor consisting essentially of a phosphonate or salts thereof, and gluconic acid or salts thereof, said phosphonate being an amine phosphonate.

20. The corrosion inhibitor of claim 19, said phosphonate being an amine polyphosponate.

21. A well brine selected from the group consisting of calcium chloride or calcium nitrate brines, or mixtures thereof, in combination with a corrosion inhibitor comprising a phosphonate or salts thereof, and gluconic acid or salts thereof, said phosphonate being an amine phosphonate.

22. The well brine claim 21, said phosphonate being an amine polyphosponate.

* * * * *